United States Patent
Li et al.

(10) Patent No.: US 11,708,303 B2
(45) Date of Patent: Jul. 25, 2023

(54) SEQUESTERING CARBON DIOXIDE INTO PRECURSORS OF BENDABLE ENGINEERED CEMENTITIOUS COMPOSITES

(71) Applicant: THE REGENTS OF THE UNIVERSITY OF MICHIGAN, Ann Arbor, MI (US)

(72) Inventors: Victor C. Li, Ann Arbor, MI (US); Brian R. Ellis, Ann Arbor, MI (US); Duo Zhang, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 17/912,727

(22) PCT Filed: Mar. 17, 2021

(86) PCT No.: PCT/US2021/022780
§ 371 (c)(1),
(2) Date: Sep. 19, 2022

(87) PCT Pub. No.: WO2021/188682
PCT Pub. Date: Sep. 23, 2021

(65) Prior Publication Data
US 2023/0129157 A1  Apr. 27, 2023

Related U.S. Application Data

(60) Provisional application No. 62/992,335, filed on Mar. 20, 2020.

(51) Int. Cl.
| | |
|---|---|
| C04B 18/08 | (2006.01) |
| C04B 18/14 | (2006.01) |
| C04B 28/04 | (2006.01) |
| C04B 7/36 | (2006.01) |
| C04B 16/06 | (2006.01) |
| C04B 20/00 | (2006.01) |
| C04B 111/00 | (2006.01) |
| C04B 103/32 | (2006.01) |

(52) U.S. Cl.
CPC .............. *C04B 18/08* (2013.01); *C04B 7/367* (2013.01); *C04B 16/06* (2013.01); *C04B 18/142* (2013.01); *C04B 20/0048* (2013.01); *C04B 28/04* (2013.01); *C04B 2103/32* (2013.01); *C04B 2111/00017* (2013.01); *C04B 2111/00215* (2013.01)

(58) Field of Classification Search
CPC ......... C04B 18/08; C04B 7/367; C04B 16/06; C04B 18/142; C04B 20/0048; C04B 28/04; C04B 2103/32; C04B 2111/00017; C04B 2111/00215
See application file for complete search history.

(56) References Cited

U.S. PATENT DOCUMENTS

| | | |
|---|---|---|
| 7,527,689 B2 | 5/2009 | Morioka et al. |
| 8,172,940 B2 | 5/2012 | Boxley et al. |
| 8,470,275 B2 | 6/2013 | Constantz et al. |
| 8,603,424 B2 | 12/2013 | Constantz et al. |
| 9,738,562 B2 | 8/2017 | Monkman et al. |
| 10,016,739 B2 | 7/2018 | Kuppler et al. |
| 2017/0073270 A1 | 3/2017 | Shao et al. |

FOREIGN PATENT DOCUMENTS

| | | |
|---|---|---|
| WO | WO-2017000075 A1 | 1/2017 |
| WO | WO-2018081310 A1 | 5/2018 |

OTHER PUBLICATIONS

International Search Report and Written Opinion regarding International Application No. PCT/US2021/022780, dated Jul. 22, 2021; ISA/US.

*Primary Examiner* — Anthony J Green
(74) *Attorney, Agent, or Firm* — Harness, Dickey & Pierce, P.L.C.

(57) ABSTRACT

Methods of preparing engineered cementitious composite precursors include carbonating a fly ash comprising >about 25% by weight of calcium oxide (CaO) and having a water content of >about 12% to <about 18% by weight of water by exposing the fly ash to a first gas stream comprising carbon dioxide to form a carbonated fly ash. A steel slag is also carbonated that comprises >about 40% by weight of calcium oxide (CaO) and having a water content of >about 12% to <about 18% by weight of water by exposing the steel slag to a second gas stream comprising carbon dioxide to form a carbonated steel slag. The carbonated fly ash and the carbonated steel slag are suitable for use as engineered cementitious composite precursors in a bendable engineered cementitious composite composition that further comprises Portland cement, a polymeric fiber, and a superplasticizer.

18 Claims, 1 Drawing Sheet

Figure 1:
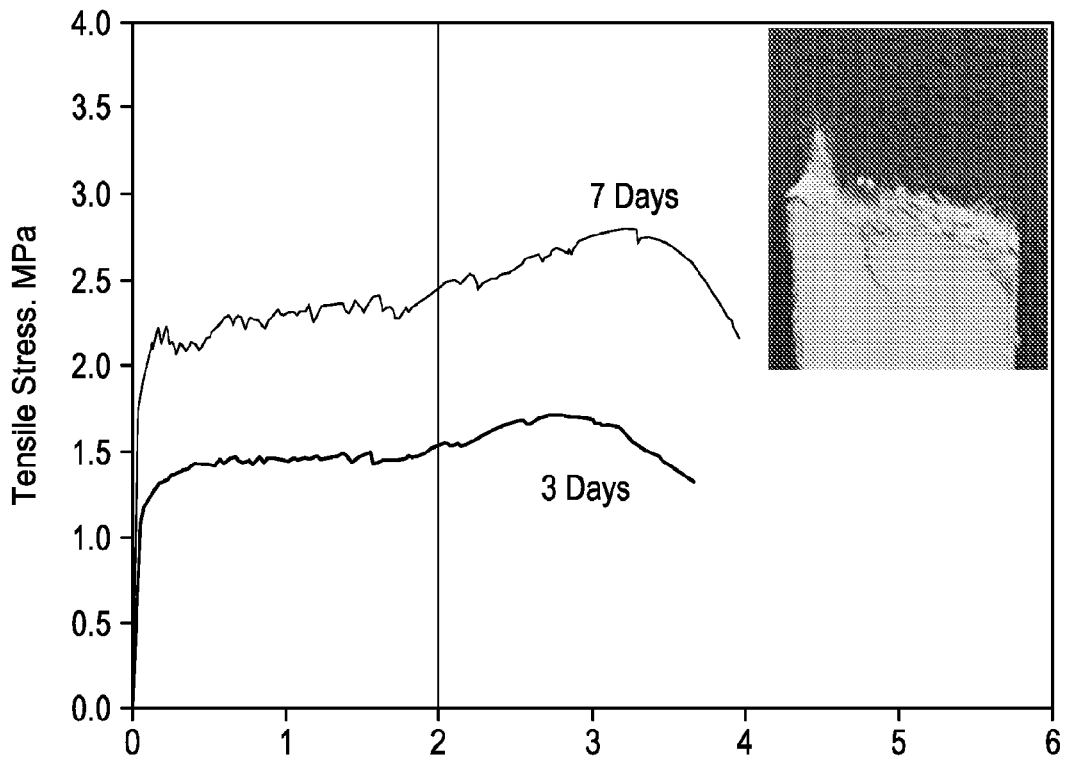

SEQUESTERING CARBON DIOXIDE INTO PRECURSORS OF BENDABLE ENGINEERED CEMENTITIOUS COMPOSITES

CROSS-REFERENCE TO RELATED APPLICATIONS

This application is a National Phase Application under 35 U.S.C. 371 of PCT International Application PCT/US2021/022780 filed on Mar. 17, 2021, which claims the benefit of U.S. Provisional Application No. 62/992,335, filed on Mar. 20, 2020. The disclosures of the above applications are incorporated herein by reference in its entirety.

FIELD

The present disclosure relates to methods of preparing carbonated precursors for engineered cementitious composites precursors to sequester carbon dioxide ($CO_2$) and form bendable engineered composite compositions.

BACKGROUND

This section provides background information related to the present disclosure which is not necessarily prior art.

Concrete is the most consumed construction material in the world. However, concrete consumes tremendous amounts of energy and natural resources, while also generating substantial waste streams and carbon emissions during its manufacture and life cycle. Traditional concrete material is formulated with Portland cement (PC), water, aggregate and a variety of mineral/chemical additives. Traditional concrete gains its binding property through various chemical reactions between the Portland cement and water, known as the hydration process, by which it develops mechanical integrity. Manufacturing of Portland cement is carbon and energy intensive, owing to the high temperature clinkering process (e.g., clinker formation occurs at 1,450° C.) needed to create appropriate hydraulic mineral components from raw ingredients, such as limestone and clay. Clinker formation accounts for approximately 5-8% of global anthropogenic carbon dioxide ($CO_2$) emissions due to fossil fuel combustion and limestone calcination. Collectively, Portland cement-based binders account for over 90% of $CO_2$ footprint of modern concrete materials. As the demand for infrastructure construction is readily increasing, it is highly desirable to seek low-carbon strategies for producing concrete.

Besides the high $CO_2$ footprint of concrete production, sustainable development within the concrete industry is also a challenge due to insufficient durability of concrete structures. Concrete is a brittle material, so that it exhibits high compressive strength, but is weak in tension. Tensile stresses, generated from restraint deformation (e.g., thermal gradients) or mechanical loadings, make concrete vulnerable to cracking. Cracks create direct pathways for the ingress of detrimental chemical species that promote material damage and structural deterioration by accelerating corrosion of reinforcing steels. Enhancing concrete durability by establishing tensile ductility and controlling cracks represents a key thrust for concrete sustainability during the life cycle of civil infrastructure. To mitigate net $CO_2$ emissions associated with the concrete industry, $CO_2$ sequestration in construction materials has gained increasing attention in recent decades due to the large storage potential and high storage safety.

Existing $CO_2$ sequestration technologies in concrete are focused on the use of Portland cement to absorb $CO_2$ through a curing process. These technologies rely on diffusion of $CO_2$ gas into concrete and require an enclosed chamber system (often pressurized) to maintain a $CO_2$-rich environment for the curing period. Thus, this $CO_2$ sequestration strategy is limited to the precast industry, which only accounts for 30% of concrete market. Moreover, concrete pH decreases after the curing process, such that the reduced pH that ensues limits use of such concrete to only non-reinforced products, because high concrete alkalinity is essential in reinforced concrete to protect the reinforcing steel from corrosion. These limitations represent one of the main obstacles for the development of many concrete $CO_2$ sequestration technologies. It would be desirable to find new methods and concrete materials to promote sustainable development capable of sequestering significant amounts of $CO_2$, while forming high quality products with long lifespans.

SUMMARY

This section provides a general summary of the disclosure, and is not a comprehensive disclosure of its full scope or all of its features.

In certain aspects, the present disclosure relates to a method of preparing engineered cementitious composite precursors. The method comprises carbonating a fly ash comprising greater than or equal to about 25% by weight of calcium oxide (CaO) and having a water content of greater than or equal to about 12% to less than or equal to about 18% by weight of water by exposing the fly ash to a first gas stream comprising carbon dioxide. The carbonating occurs so that the fly ash has greater than or equal to about 4% by weight of carbon dioxide uptake on a dry basis to form a carbonated fly ash. The method also comprises carbonating a steel slag comprising greater than or equal to about 40% by weight of calcium oxide (CaO) and having a water content of greater than or equal to about 12% to less than or equal to about 18% by weight of water by exposing the steel slag to a second gas stream comprising carbon dioxide. The carbonating occurs so that the steel slag has greater than or equal to about 5% by weight of carbon dioxide uptake on a dry basis to form a carbonated steel slag. The carbonated fly ash and the carbonated steel slag are suitable for use as engineered cementitious composite precursors in an engineered cementitious composite composition that further comprises Portland cement, a polymeric fiber, and a superplasticizer.

In one aspect, carbonating the fly ash occurs until the fly ash has greater than or equal to about 6% by weight of carbon dioxide uptake in the carbonated fly ash and the carbonating the steel slag occurs until the steel slag has greater than or equal to about 8% by weight of carbon dioxide uptake on a dry basis in the carbonated steel slag.

In one aspect, the method further comprises prior to the carbonating the fly ash, introducing water into the fly ash to provide the water content of greater than or equal to about 12% to less than or equal to about 18% by weight of water.

In one further aspect, after the carbonating the fly ash, the carbonated fly ash is dried so that it has a water content of less than or equal to about 0.5% by weight.

In one further aspect, the method further comprises milling the carbonated fly ash.

In one further aspect, after the milling, the carbonated fly ash has an average particle size of less than or equal to about 30 μm.

In one aspect, the method further comprises prior to the carbonating the steel slag, sieving the steel slag so that steel slag subjected to the carbonating has an average particle size of less than or equal to about 220 µm.

In one further aspect, the method further comprises prior to the carbonating steel slag, measuring a water content of the steel slag and adjusting the water content to be greater than or equal to about 12% to less than or equal to about 18% by weight of water.

In one aspect, the steel slag further comprises greater than or equal to about 10% to less than or equal to about 35% by weight silicon dioxide ($SiO_2$), less than or equal to about 15% by weight of aluminum oxide ($Al_2O_3$), less than or equal to about 15% by weight magnesium oxide (MgO), less than or equal to about 35% by weight iron oxide ($Fe_2O_3$), and less than or equal to about 5% by weight of sulfur oxide ($SO_3$).

In one aspect, the fly ash further comprises greater than or equal to about 20% to less than or equal to about 40% by weight silicon dioxide ($SiO_2$), less than or equal to about 20% by weight of aluminum oxide ($Al_2O_3$), less than or equal to about 10% by weight magnesium oxide (MgO), less than or equal to about 10% by weight iron oxide ($Fe_2O_3$), and less than or equal to about 5% by weight of sulfur oxide ($SO_3$).

In one aspect, at least one of the first gas stream and the second gas stream are generated by an industrial source.

In certain aspects, the present disclosure relates to a method of preparing engineered cementitious composite that comprises mixing a carbonated fly ash having greater than or equal to about 6% by weight of carbon dioxide uptake on a dry basis, a carbonated steel slag having greater than or equal to about 8% by weight of carbon dioxide uptake on a dry basis, Portland cement, at least one polymeric fiber, a superplasticizer, and water together to form an admixture that hydrates. After the mixing, the engineered cementitious composite is formed having a tensile strain capacity of greater than or equal to about 2% and a uniaxial tensile strength of greater than or equal to about 1 MPa.

In one aspect, the engineered cementitious composite has an autogenous crack width of less than or equal to about 100 µm.

In one aspect, the uniaxial tensile strength of greater than or equal to about 3 MPa.

In one aspect, the engineered cementitious composite contains only the carbonated steel slag as an aggregate.

In one aspect, the engineered cementitious composite comprises greater than 0 to less than or equal to about 2 volume % of the at least one polymeric fiber.

In one aspect, the engineered cementitious composite comprises the carbonated fly ash and the Portland cement as cementitious binders, wherein the engineered cementitious composite comprises greater than or equal to about 40 weight % to less than or equal to about 75 weight % of the carbonated fly ash and greater 25 weight % to less than or equal to about 60 weight % Portland cement.

In one aspect, the admixture comprises the Portland cement at a mass ratio of about 1, the carbonated fly ash at a mass ratio of greater than or equal to about 1.2 to less than or equal to about 2.2, the carbonated steel slag at a mass ratio of greater than or equal to about 0.8 to less than or equal to about 1.2, water at a mass ratio of greater than or equal to about 0.58 to less than or equal to about 0.8, and the superplasticizer at a mass ratio of greater than or equal to about 0.007 to less than or equal to about 0.015.

In certain other aspects, the present disclosure relates to an engineered cementitious composite comprising carbonated fly ash at a mass ratio of greater than or equal to about 1.2 to less than or equal to about 2.2, where the carbonated fly ash has greater than or equal to about 6% by weight of carbon dioxide uptake on a dry basis. The engineered cementitious composite also comprises Portland cement at a mass ratio of about 1. A carbonated steel slag is present at a mass ratio of greater than or equal to about 0.8 to less than or equal to about 1.2. The carbonated fly ash has greater than or equal to about 8% by weight of carbon dioxide uptake on a dry basis. Water is present at a mass ratio of greater than or equal to about 0.58 to less than or equal to about 0.8. Superplasticizer is present at a mass ratio of greater than or equal to about 0.007 to less than or equal to about 0.015. The engineered cementitious composite also comprises at least one polymeric fiber. The engineered cementitious composite having a tensile strain capacity of greater than or equal to about 2% and a uniaxial tensile strength of greater than or equal to about 2 MPa.

In one aspect, the at least one polymeric fiber is present at greater than 0 to less than or equal to about 2 volume % of the at least one polymeric fiber.

In one aspect, the engineered cementitious composite further comprises further an additive selected from the group consisting of: microsilica, silica flour, a cellulose-based additive, and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows tensile stress (MPa) versus tensile strain (%) for an example of an engineered cementitious composite comprising carbonated precursors prepared in accordance with certain aspects of the present disclosure at 3 days and 7 days. The inset shows a photograph of a fractured surface, where the incorporated polymeric fibers pulled out from the cementitious matrix. The composite tensile ductility achieved over 2% after 3 days and 3% after 7 days, demonstrating the viability of using carbonated precursors for ductility development.

Figure 2:
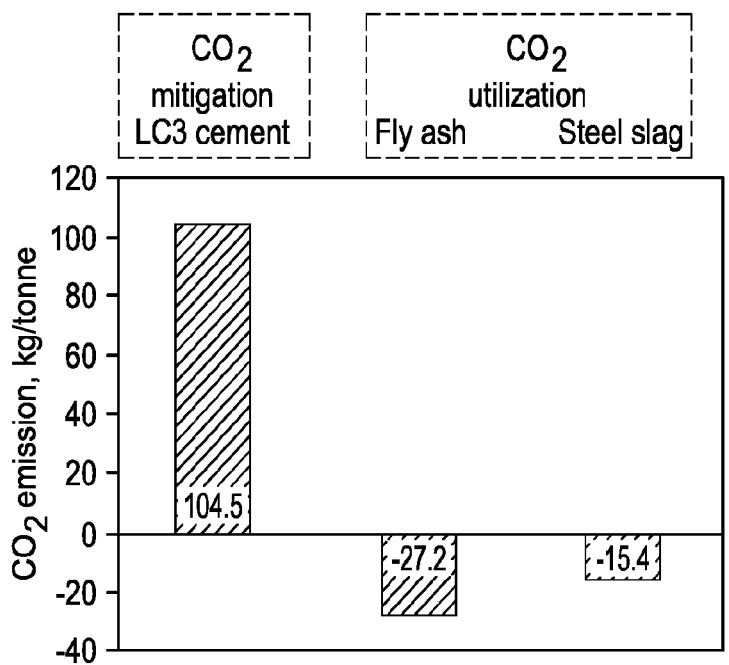

FIG. 2 shows a net carbon dioxide footprint for an example of an engineered cementitious composite comprising carbonated precursors prepared in accordance with certain aspects of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, unless otherwise indicated, amounts expressed in weight and mass are used interchangeably, but should be understood to reflect a mass of a given component.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

Example embodiments will now be described more fully with reference to the accompanying drawings.

As discussed above, concrete that incorporates Portland cement is widely used in modern infrastructure systems. However, traditional Portland cement manufacturing is energy and natural resource intensive, generating large volumes of waste and emissions, including carbon emissions. $CO_2$ sequestration in construction materials has gained increasing attention in recent decades due to the safe storage of $CO_2$ emissions and large storage potential. In conventional concrete, Portland cement-based systems have typically demonstrated capability of chemically trapping $CO_2$, typically less than 20 weight % (e.g., about 5-20 weight %). This process, also known as carbonation, can promote chemical stability and enhance material durability when exposed to a variety of aggressive environments. Nevertheless, the alkaline environment created by Portland cement hydration is neutralized during the carbonation process, which substantially raises the risk of corrosion for conventional reinforced concrete.

Existing technologies to capture $CO_2$ have generally focused on precast and ready-mix concrete applications. As noted above, some technologies rely on diffusion of $CO_2$ gas into concrete and require an enclosed chamber system (often pressurized) to maintain a $CO_2$-rich environment for the curing period. Thus, this $CO_2$ sequestration strategy is limited to the precast industry, which only accounts for 30% of concrete market.

Alternatively, $CO_2$ can be sequestered directly in ready-mix concrete by injecting $CO_2$ gas into fresh concrete during mixing. This can be achieved by upgrading equipment on existing mixing trucks and is therefore not limited to precast concrete production applications. However, this approach generally leads to a low $CO_2$ uptake (approximately 1% by Portland cement mass) and is not able to fully utilize the $CO_2$ sequestration capacity of Portland cement (approximately 50%). However, $CO_2$ utilization has not been demonstrated on ductile composite formulations, nor has it been focused on development of pre-carbonated ingredients for producing ductile cementitious composites.

To fulfill the urgent need for seeking new strategies for effective $CO_2$ abatement, the methods and concrete materials provided by various aspects of the present disclosure innovatively sequester $CO_2$ into concrete precursor ingredients, which develops a new type of highly ductile and strain-hardening cementitious composite with the $CO_2$-sequestered ingredients. This inventive technology also benefits the coal power and steel refining industries by transforming waste byproduct streams, namely waste coal fly ash and steelmaking slag, into beneficial concrete products. As will be described further below, ingredients are pre-carbonated and their use eliminates the need for a large-scale $CO_2$ chamber and does not affect concrete pH. Consequently, the cementitious composites provided in accordance with certain aspects of the present disclosure are not limited to any product type or size, and can be applied to general infrastructure including reinforced and cast-in-place applications. The high $CO_2$ storage potential and enhanced material durability collectively serve to create a more efficient, durable and sustainable concrete infrastructure system. The use of industrial waste for carbon sequestration that is incorporated into concrete diverts industrial waste streams from potentially hazardous storage (in landfills, lagoons, and the like) into beneficial uses in the construction industry.

The present disclosure provides a new carbon dioxide ($CO_2$) sequestration technology that integrates ductile cementitious formulations with $CO_2$ capture processes when forming the precursor ingredients. Such methods are particularly suitable for use in conjunction with coal powered facilities and steel manufacturing facilities, where waste coal ashes, waste slags, and/or waste $CO_2$ from coal or other fuel combustion can be transformed to a ductile and durable concrete product through processes in accordance with certain aspects of the present disclosure. In certain variations, the high ductility concrete material can be used with steel reinforcement without suffering from enhanced corrosion; however, the high ductility concrete material can also potentially eliminate the need for steel reinforcement to further extend structural service life by eliminating corrosion-induced deteriorations. The low-carbon beneficially reused ingredients, high $CO_2$ storage capability and enhanced material durability collectively serve to create a more efficient, durable and sustainable concrete infrastructure system.

The present disclosure provides methods for permanently sequestering $CO_2$ into concrete materials through mineral carbonation. In certain aspects, two aspects of the methods are contemplated. First, precursor concrete ingredients are processed via a mineral carbonation process for $CO_2$ sequestration. More specifically, this process creates a carbonated fly ash and a carbonated slag for use as ingredients in a ductile cementitious composition. Thus, the carbonated ingredients are used to form a ductile cementitious composite.

In certain aspects, the present disclosure contemplates a method of preparing an engineered concrete precursor. First, one or more fly ashes comprising calcium oxide (CaO) formed from fossil fuel or coal combustion is selected. The CaO-bearing minerals in fly ash can be used to react with $CO_2$, more specifically, they can be used for converting $CO_2$ into $CaCO_3$. In one variation, the calcareous fly ash may be a Class C fly ash as designated by ASTM C618-19, which may be formed from combustion of coals. ASTM C618 requires that Class C fly ashes contain at least 50% pozzolanic compounds (silica oxide, alumina oxide, and iron oxide). Class C fly ash is typically formed from combustion of lignite or subbituminous coal. Class C has greater than or equal to 18% calcium oxide (CaO). Class C fly ash has pozzolanic properties, as well as some cementitious properties. Table 1 has typical chemical compositions of Class C #1 fly ash and Class C #2 fly ash and estimated carbon dioxide uptake levels.

TABLE 1

| Chemical compositions of fly ashes | | |
|---|---|---|
| Component | Class C #1 | Class C #2 |
| CaO | 28.0 | 27.6 |
| $SiO_2$ | 33.0 | 32.8 |
| $Al_2O_3$ | 19.5 | 19.1 |
| $Fe_2O_3$ | 5.9 | 6.7 |
| $SO_3$ | 2.8 | 2.1 |
| MgO | 4.1 | 4.7 |
| $K_2O$ | 0.6 | 0.7 |
| $TiO_2$ | 1.6 | 1.3 |
| MnO | — | — |
| $P_2O_5$ | 1.2 | 1.5 |
| $CO_2$ uptake | 7.1% | 5.2% |

It should be noted that the amount of oxides present in the composition is reflective of the simple oxide analysis. As used herein, all percentages are on a weight basis, unless indicated as otherwise. It should also be noted that the chemical compositions of various materials described herein are expressed in terms of simple oxides calculated from elemental analysis, typically determined by x-ray fluorescence techniques. While the various simple oxides may be, and often are, present in more complex compounds in a given material, the oxide analysis is a useful method for expressing the concentration of compounds of interest in the respective compositions.

In certain variations, the calcareous fly ash may comprise greater than or equal to 18% by weight calcium oxide (CaO) (and thus be a Class C fly ash). As calcium oxide (CaO) is the main component that is responsible for carbonation in the fly ash, it is desirable to maximize the CaO content of the fly ash. Silicon dioxide ($SiO_2$) content of fly ash has a relatively consistent range considering the different sources, for example, typically greater than or equal to about 30% by weight of the overall fly ash composition. Aluminum oxide ($Al_2O_3$) and iron oxide ($Fe_2O_3$) generally do not contribute to carbon dioxide ($CO_2$) sequestration or uptake, therefore their presence in fly ash may be selected to be as minimal as possible. Additionally, sulfur oxide ($SO_3$) is detrimental to dimensional stability and mechanical integrity of cement and concrete, therefore, in general, its content in the fly ash is desirably limited to less than about 5%.

In certain variations, particularly suitable calcareous fly ash may have a composition comprising calcium oxide (CaO) present at greater than or equal to about 25% by weight of the fly ash, optionally greater than or equal to about 26% by weight, optionally greater than or equal to about 27% by weight, optionally greater than or equal to about 28% by weight, and in certain embodiments, optionally greater than or equal to about 29% by weight of the total fly ash composition. The fly ash may comprise silicon dioxide ($SiO_2$) present at greater than or equal to about 20% to less than or equal to about 40% by weight of the total fly ash composition. The fly ash may comprise aluminum oxide ($Al_2O_3$) at less than or equal to about 20% by weight of the total fly ash composition. The fly ash may comprise magnesium oxide (MgO) at less than or equal to about 10% by weight of the total fly ash composition. The fly ash may comprise iron oxide ($Fe_2O_3$) at less than or equal to about 10% by weight of the total fly ash composition. The fly ash may further comprise sulfur oxide ($SO_3$) at less than or equal to about 5% by weight of the total fly ash composition. The fly ash composition may comprise other components, impurities, and diluents.

In accordance with various aspects of the present disclosure, the carbonated fly ash precursor is formed as follows. First, water is introduced to the fly ash precursor to moisten it. Second, the fly ash precursor is carbonated. Next, the carbonated fly ash is dried or dehumidified, where the water content is reduced. Finally, the carbonated fly ash may be milled.

The fly ash precursor may have the water content adjusted, for example, by moistening the fly ash precursor. The purpose of this step is to provide a sufficient aquatic environment for mineral carbonation. However, the moisture content is not so high as to cause flooding of the pores within the fly ash or to inhibit mineral carbonation by impeding flow of carbon dioxide gas into the fly ash precursor. During the carbonation process, the fly ash precursor desirably has a water content of greater than or equal to about 12% to less than or equal to about 18% by weight of water, optionally greater than or equal to about 13% to less than or equal to about 17% by weight of water, optionally greater than or equal to about 14% to less than or equal to about 16% by weight of water, and in certain aspects, about 15% by weight water of the overall fly ash precursor weight. By way of example, as-received fly ash can be moistened by mixing it with 15 weight % water to produce a uniformly dampened mixture. The wet mixture may be spread into a thin layer (e.g., with a thickness of less than 10 mm) on a substrate or plate to increase surface area for $CO_2$ exposure. To avoid water loss, the wet fly ash precursor mixture is transferred immediately transferred to a chamber for carbonation to avoid any water loss. It should be noted that on an industrial scale, the water content may be slightly increased to account for evaporative water loss during handling and transport of the moistened fly ash precursor.

The carbonating occurs by exposing the moistened fly ash precursor to a first gas stream comprising carbon dioxide to form a carbonated fly ash. In certain aspects, carbonation is conducted in an enclosed vessel or reactor. In certain aspects, the first gas stream has a high $CO_2$ content (e.g., greater than 90% by weight, optionally greater than or equal to about 95% by weight, and in certain aspects, optionally greater than or equal to about 98% by weight). The first gas stream may also have a high gas pressure to promote the rate of carbonation of the fly ash precursor. While the first gas stream may have an ambient pressure, the rate of carbonation will be greater and accelerated if higher pressures are applied. In certain variations, a pressure of the first gas stream introduced into the reactor where carbonation occurs is greater than or equal to about 1 atm of pressure to less than or equal to about 1.5 atm pressure. Where the first gas stream is a low-grade $CO_2$ source, such as coal combustion flue gas having a relatively low $CO_2$ content, it can be used for a longer duration to achieve the desired carbonation levels. Heating or humidifying are not needed for the carbonation process. Thus, the first gas stream may have an ambient temperature. In certain aspects, the first gas stream is continuously supplied to the reactor. In one variation, for 1 kg of wet fly ash precursor mixture, carbonation lasts for at least about 30 minutes at about 1.5 atm pressure.

The carbonating process progresses until the fly ash has greater than or equal to about 4% by weight of carbon dioxide uptake of the total weight of the carbonated fly ash composition, optionally greater than or equal to about 5% by weight of carbon dioxide uptake, optionally greater than or equal to about 6% by weight of carbon dioxide uptake, optionally greater than or equal to about 7% by weight of carbon dioxide uptake, and in certain aspects, optionally greater than or equal to about 8% by weight of carbon dioxide uptake. While it is desirable to maximize an amount of carbonation in the fly ash, for certain fly ash compositions like those described above, the carbonation process may provide greater than or equal to about 4% by weight to less than or equal to about 9% of carbon dioxide uptake, optionally greater than or equal to about 6% by weight to less than or equal to about 9% of carbon dioxide, and in certain variations, optionally greater than or equal to about 7% by weight to less than or equal to about 9% of carbon dioxide.

Next, the carbonated fly ash product may be dehumidified or dried. Residual water in the fly ash mixture is removed after carbonation via a dehumidification or drying process. In one variation, the carbonated fly ash can be heated at a temperature of greater than or equal to about 60° C. to less than or equal to about 100° C. Where the carbonation process occurs at a facility that generated the first waste stream (e.g., a power generating or coal-fired facility or a metal manufacturing facility), the heat may be sources as waste heat. The fly ash may be dried or dehumidified for greater than or equal to about 30 minutes. For example, in one variation, approximately 30 minutes of heating at 60° C. adequately dehumidified 1 kg of carbonated fly ash. In certain aspects, a range of residual water or the water content after the drying or dehumidification process is less than or equal to about 0.5% by weight of the carbonated fly ash. The range of residual water content less than about 3.5% of the carbonated fly ash, optionally less than or equal to about 1% by weight of the carbonated fly ash, and optionally less than or equal to about 0.5% by weight of the carbonated fly ash. A consistent water content in the carbonated fly ash is desirable for attaining consistent properties in the engineered cementitious composite when the carbonated fly ash is combined with other ingredients.

The carbonation process alters fly ash to a form of an ash-granule mixture. In certain aspects, the granules may be as large as 5 mm to 10 mm in diameter. To be suitable for use as an alternative supplementary cementitious material (SCM) in an engineered cementitious composite in place of virgin fly ash, the carbonated fly ash may be milled down to an average particle size diameter of less than or equal to about 30 μm. The milled carbonated fly ash may have an average particle size diameter of greater than or equal to about 15 μm to less than or equal to about 30 μm. In one variation, the milling or comminution step may be conducted in a ball mill with a grinding media. At a laboratory scale, a ball mill using zirconia grinding media may be conducted at a low speed (30 rpm), where the milling process can be completed in 6 hours, allowing over 90% of carbonated fly ash to pass a 30 μm sieve.

In certain aspects, the methods above contemplate the calcareous fly ash being in a pulverized form after carbonation and having an average particle size diameter of less than or equal to about 30 μm, for example, greater than or equal to about 15 μm to less than or equal to about 30 μm. In this manner, the carbonated fly ash prepared in accordance with certain aspects of the present teachings can be directly used as a supplementary cementitious material (SCM) as part of a cementitious binder system to partially replace Portland cement in conventional concrete.

The method of preparing an engineered concrete precursor further comprises carbonating one or more slags comprising calcium oxide (CaO) and silicates. Slag materials are industrial byproducts of metal manufacturing and processing. The term "slag" encompasses a wide variety of byproduct materials, typically including a large portion of the non-metallic byproducts of ferrous (e.g., steel) metal manufacturing and processing. Generally, slagging agents or flux materials, are added to furnaces to strip impurities from the molten iron ore, steel scrap, iron, or steel feed stock during processing. Typical flux materials are limestone (calcium carbonate ($CaCO_3$)) and/or dolomite ($CaCO_3 \cdot MgCO_3$). Molten slag forms and floats to the top of the furnace. The composition and properties of the slag can vary based on the metal composition being processed, the type of furnace, and the post-processing treatment, which can affect not only the chemical composition, but the crystallinity, phase development, and surface morphology that can impact reactivity.

Processing of pig iron and other steel materials in steelmaking furnaces can generate steel slags that are suitable for use in accordance with the present technology. Typical steel furnaces include basic oxygen process furnaces (BOF), electric arc furnaces (EAF), and open hearth furnaces (OHF). Steel is predominantly made in integrated steel plants using a version of the basic oxygen process or in specialty steel plants employing an electric arc furnace process.

Many different grades of steel can be produced and the properties of the steel slag can change with each grade. Grades of steel can be classified as high, medium, and low, depending on the carbon content of the steel, where high-grade steels have higher carbon content and low-grade steels have low carbon content. To reduce the amount of carbon in the steel, greater oxygen levels are required in the steelmaking process. This also requires the addition of increased levels of flux material for the removal of impurities from the steel and increased slag formation. So called "carbon slags" have a carbon content above an impurity level.

Steel furnace slag may have higher amounts of reactive calcium oxide and silicates. Steelmaking slag has a relatively hard texture and is mostly inert to chemical reactions with cement hydration products. The calcium silicate minerals in steelmaking slag are responsible for the $CO_2$ reactivity of the material. There are several different types of steel slag produced during the steel-making process, including furnace or tap slag, raker slag, synthetic or ladle slags, and pit or cleanout slag and are generated during different stages of the steel making process. It should be noted that the slag component may comprise a combination of slags originating from different locations of the furnace and/or processing or may include combinations of slags from different furnaces or processes. The term "furnace" encompasses both iron ore and steel converters. Generally, blast furnace slags refer to those generated in iron ore furnaces and steel slags are those generated by any steel forming or refining process, including stainless steel slags. Depending on the location from which they originate in the process and subsequent processing, many of the slags have different particle size distributions, different mineralogy and crystal formation. Stainless steel slags are particularly suitable materials for use as the slag component, as they typically comprise relatively high concentrations of calcium oxide and free lime. In one particularly suitable variation, the steel slag is a fine Basic Oxygen Furnace (BOF) slag. Any of these slags may be further ground to achieve desirable particle size distributions and/or fineness (surface area).

In certain variations, the calcareous slag may comprise greater than or equal to 40% by weight calcium oxide (CaO). As calcium oxide (CaO) is a major component that is responsible for carbonation in the steel slag, it is desirably to maximize the CaO content of the steel slag. Silicon dioxide ($SiO_2$) content of steel slag varies from source to source, and its content generally does not affect carbon dioxide ($CO_2$) uptake/sequestration capacity. The capacity of $CO_2$ sequestration is generally governed by the total CaO content. The mineral form of CaO (e.g., dicalcium silicates) can affect the direct reactivity or rate of $CO_2$ uptake at ambient conditions. Aluminum oxide ($Al_2O_3$) and iron oxide ($Fe_2O_3$) generally do not contribute to carbon dioxide ($CO_2$) sequestration or uptake, therefore their presence in steel slag may be selected to be minimal or as low as possible. Additionally, sulfur oxide ($SO_3$) is detrimental to dimensional stability and mechanical integrity of cement and concrete, therefore, in general, its content in the slag is desirably limited to less than about 5%.

In certain variations, particularly suitable steel slag may have a composition comprising calcium oxide (CaO) present at greater than or equal to about 35% by weight of the steel slag, optionally greater than or equal to about 40% by weight, optionally greater than or equal to about 45% by weight, optionally greater than or equal to about 50% by weight, and in certain embodiments, optionally greater than or equal to about 55% by weight of the total steel slag composition. The steel slag may comprise silicon dioxide ($SiO_2$) present at greater than or equal to about 10% to less than or equal to about 35% by weight of the total steel slag composition. The steel slag may comprise aluminum oxide ($Al_2O_3$) at less than or equal to about 15% by weight of the total steel slag composition. The steel slag may comprise magnesium oxide (MgO) at less than or equal to about 15% by weight of the total steel slag composition. The steel slag may comprise iron oxide ($Fe_2O_3$) at less than or equal to about 35% by weight of the total steel slag composition. The steel slag may further comprise sulfur oxide ($SO_3$) at less than or equal to about 5% by weight of the total steel slag composition. The slag composition may comprise other components, impurities, and diluents.

Table 2 has typical chemical compositions of two representative examples of steel (BOF) slags and estimated carbon dioxide uptake levels.

TABLE 2

Chemical compositions of steel slags

| Component | Slag #1 | Slag #2 |
|---|---|---|
| CaO | 45.2 | 40.2 |
| $SiO_2$ | 14.6 | 33.8 |
| $Al_2O_3$ | 3.9 | 9.3 |
| MgO | 3.1 | 9.8 |
| $Fe_2O_3$ | 27.1 | 0.8 |
| $SO_3$ | 0.2 | 3.6 |
| $TiO_2$ | 0.6 | 0.7 |
| MnO | 3.9 | 0.5 |
| $CO_2$ uptake | 7.5% | 4.5% |

As with the fly ash compositional analysis, it should be noted that the amount of oxides present in the slag composition is reflective of the simple oxide analysis. As used herein, all percentages are on a weight basis, unless indicated as otherwise. It should also be noted that the chemical compositions of various materials described herein are expressed in terms of simple oxides calculated from elemental analysis, typically determined by x-ray fluorescence techniques. While the various simple oxides may be, and often are, present in more complex compounds in a given material, the oxide analysis is a useful method for expressing the concentration of compounds of interest in the respective compositions.

As will be described further below, the carbonated steel slag serves the purpose of sequestering $CO_2$ into a precursor of the ductile engineered cementitious composite material, as well as functioning as a replacement for sand (fine aggregate). In accordance with various aspects of the present disclosure, the carbonated steel slag precursor is formed as follows. Steelmaking slag is typically a granule mixture comprising various particle sizes. First, the steelmaking slag particles may be separated by passing the steelmaking slag granule mixture through a sieve in a sieving process. Then, the amount of water in the steel slag is regulated, for example, by humidity regulation. Finally, the steel slag precursor is carbonated.

For the sieving process, the raw steelmaking slags are sieved to obtain sand particles having a desired average particle size diameter. In various aspects, the slag particles are processed by the following methods to form the carbonated steel slag have an average particle size diameter of less than or equal to about 425 μm, optionally less than or equal to about 220 μm, optionally less than or equal to about 215 μm, optionally less than or equal to about 212 μm, and in certain variations, optionally less than or equal to about 105 μm. By way of example, one suitable steel slag is a fine Basic Oxygen Furnace (BOF) slag, in which more than 40 wt. % of the raw particles have a particle size diameter of less than 212 μm. When the as received steel slag is sieved, this passing portion of the particles can be directly used in the process without grinding. In certain aspects, slag particles having an average particle diameter of greater than those specified above can also be used, either as pre-carbonated coarse aggregate in their as-received form (in other words, not subjected to carbonation described herein). Additionally, the larger particle sizes removed after sieving can be further processed, for example, by subjecting them to an additional grinding and/or secondary sieving process so that they have the desired particle size prior to carbonation. Such a milling or comminution step may be conducted in a ball mill with a grinding media. Thus, particles of steel slag having the desired range of particle sizes are further processed as follows.

The raw steelmaking slag is stored in a variety of different environments and the moisture content is therefore inconsistent across different sample batches. Thus, the water content may be adjusted to a desired level. Again, having an appropriate water content level provides a sufficient aquatic environment for mineral carbonation, but avoids the moisture content being too high that it might cause flooding of the pores within the steel slag or otherwise inhibit mineral carbonation. During the carbonation process, the steel slag precursor desirably has a water content of greater than or equal to about 12% to less than or equal to about 23% by weight of water of dry slag weight, optionally greater than or equal to about 13% to less than or equal to about 20% by weight of water of dry slag weight, optionally greater than or equal to about 13% to less than or equal to about 18% by weight of water of dry slag weight, optionally greater than or equal to about 13% to less than or equal to about 17% by weight of water, optionally greater than or equal to about 14% to less than or equal to about 16% by weight of water, and in certain aspects, about 15% by weight water of the overall steel slag precursor weight. To achieve the optimal efficiency in the subsequent carbonation process, moisture content in the slag is measured and adjusted as necessary to be within the above listed ranges. In certain aspects, water may be added to the steel slag in an appropriate amount and subsequently mixed in a mill or mixer, such as a concrete mixer. Otherwise, the slag may be dried at ambient conditions or heated to remove water.

Once the steelmaking slag is at the optimal moisture conditions, it can then be transferred to an enclosed chamber or reactor for the carbonation reaction. The wet mixture may be spread into a thin layer (e.g., with a thickness of less than 10 mm) on a substrate or plate to increase and maximize surface area for $CO_2$ exposure. To avoid water loss, the wet steel slag precursor mixture is transferred immediately transferred to a chamber for carbonation to avoid any water loss. It should be noted that on an industrial scale, the water content may be slightly increased to account for evaporative water loss during handling and transport of the moistened steel slag precursor.

The carbonating occurs by exposing the moistened steel slag precursor to a second gas stream comprising carbon dioxide to form a carbonated steel slag. In certain aspects, carbonation is conducted in an enclosed vessel or reactor. In certain aspects, the second gas stream has a high $CO_2$ content (e.g., greater than 90% by weight, optionally greater than or equal to about 95% by weight, and in certain aspects, optionally greater than or equal to about 98% by weight). The second gas stream may also have a high gas pressure to promote the rate of carbonation of the steel slag precursor. While the second gas stream may have an ambient pressure, the rate of carbonation will be greater and accelerated if higher pressures are applied. In certain variations, a pressure of the second gas stream introduced into the reactor where carbonation occurs is greater than or equal to about 1 atm of pressure. Where the second gas stream is a low-grade $CO_2$ source, such as coal combustion flue gas having a relatively low $CO_2$ content, it can be used for a longer duration to achieve the desired carbonation levels. Heating or humidifying are not needed for the carbonation process. In certain aspects, the second gas stream is continuously supplied to the reactor. In one variations, for 1 kg of wet steel slag precursor mixture, carbonation lasts for at least about 60 minutes at about 1.5 atm pressure.

The carbonating process progresses until the steel slag has greater than or equal to about 3% by weight of carbon dioxide uptake of the total weight of the carbonated steel slag composition, optionally greater than or equal to about 4% by weight of carbon dioxide uptake, optionally greater than or equal to about 5% by weight of carbon dioxide uptake, optionally greater than or equal to about 6% by weight of carbon dioxide uptake, optionally greater than or equal to about 7% by weight of carbon dioxide uptake, optionally greater than or equal to about 8% by weight of carbon dioxide uptake, and in certain aspects, optionally greater than or equal to about 9% by weight of carbon dioxide uptake. While it is desirable to maximize an amount of carbonation in the steel slag, for certain steel slag compositions like those described above, the carbonation process may provide greater than or equal to about 5% by weight to less than or equal to about 10% of carbon dioxide uptake, optionally greater than or equal to about 6% by weight to less than or equal to about 10% of carbon dioxide, optionally greater than or equal to about 7% by weight to less than or equal to about 10% of carbon dioxide, optionally greater than or equal to about 8% by weight to less than or equal to about 10% of carbon dioxide, and in certain variations, optionally greater than or equal to about 9% by weight to less than or equal to about 10% of carbon dioxide.

In this manner, the carbonated slag can be directly used as an aggregate replacement, for example, as a replacement for sand. Water content of the carbonated slag product may need to be measured; however, and an amount of water added when forming the ductile engineered cement composite formulations may be adjusted accordingly to account for water content of the carbonated slag.

In various aspects, the carbonated steel slag and the carbonated slag are suitable for use as ingredients to form an engineered ductile cementitious composite concrete. The cementitious composite concrete may be considered to be an engineered cementitious composite (ECC). ECCs are a type of high-performance fiber-reinforced cementitious composites (HPFRCC) with significant strain-hardening behavior under tension. The broad ECC family of cementitious materials is compatible with typical concrete processing methods (e.g., pouring into molds or forms/formwork, spraying, and the like). Many ECCs have the ability to reach tensile strain capacities of about 3 to 5% under loading, as compared with 0.01 to 0.02% for traditional concrete, while maintaining tight crack widths of less than or equal to about 100 and in certain variations, less than or equal to about 50 µm. These tight crack widths are an intrinsic material property of the ECC and do not depend on the amount of steel reinforcement or the size of a structure. Further, due to the high ductility of ECCs, an ECC slab can undergo extensive bending without fracture, similar to the behavior of a ductile metal.

Moreover, ECCs can exhibit self-healing properties, where a combination of intrinsic reactions form healing products, which fill and bind the faces of the microcracks of ECC when damage occurs. The continued hydration of unreacted cement, pozzolanic reactions, and carbonation produce calcium silicate hydrates (C-S-H) and calcium carbonate ($CaCO_3$), which have been found to be the two main healing products formed in ECC. It has been shown that the extent of self-healing is highly dependent on the crack width of a concrete material, with smaller cracks heal more completely and at a faster rate than larger cracks. Therefore, the tight crack widths of ECC promote robust self-healing behavior, which allows the damaged material to regain both permeability and mechanical properties. ECC materials can undergo self-repair in the presence of water (for example, relative humidity or precipitation) and oxygen (e.g., air), making self-healing ECC feasible for outdoor infrastructure applications.

ECCs generally comprise a cementitious binder, such as one or more pozzolanic materials, one or more polymeric fibers, one or more aggregates, and water, among other possible components. The micromechanics of ECCs have been previously described, and differ from those of other fiber-reinforced concretes. In short, when brittle cementitious matrix fractures are in tension in ECCs, the dispersed polymeric fibers are able to bridge the crack, holding the crack to several tens of microns in width, while carrying the tensile load such that further opening of the microcrack requires more energy than originating a microcrack elsewhere in the matrix. As this cycle is repeatable, the composite is able to distribute deformation throughout and suppress brittle fracture failure. Thus, ECCs are more damage and flaw tolerant than other fiber-reinforced materials due to strain-hardening behavior occurring, rather than strain-softening behavior. ECCs exhibit tensile ductility (strain capacity prior to failure, where failure is defined as the inability to carry and increasing load) and toughness (energy required to cause failure) hundreds of times those values of traditional concretes, providing the potential to eliminate or diminish the amount of steel reinforcement necessary to accommodate tensile loading. In certain aspects, the structural components formed of a cementitious composite material prepared in accordance with the present teachings may be free of reinforcement metal structures, such as steel reinforcements (e.g., rebar) that are traditionally used in concrete for withstanding tensile loads. Cementitious composite compositions can be used that exhibit the characteristic strain-hardening behavior of ECCs, but are also treated in accordance with the present disclosure to have sequestered carbon dioxide.

In certain variations, the ECC cementitious composition comprises a binder or pozzolanic material, including the carbonated fly ash described above. The pozzolanic material may further comprise Portland cement. The ECC cementitious composition further comprises at least one aggregate, including the carbonated steel slag, and optionally other aggregates such as a silica sand. The ECC cementitious composition comprises at least one polymeric fiber and water. In certain variations, the cementitious composite material also comprises additional components, such as superplasticizers and high range water reducing agents.

After the carbonation process, the carbonated fly ash serves as a pozzolanic material due to remaining reactivity of silicates. Carbonation generally consumes CaO, but leaves $SiO_2$. Pozzolanic reaction in such materials is mainly governed by the $SiO_2$ content in the carbonated fly ash. The carbonated fly ash may be present in the cementitious composite material at greater than 40 mass or weight % to less than or equal to about 75 weight % of the total cementitious binders (including pozzolanic materials) present in the cementitious composition and optionally at greater than or equal to about 30 weight % to less than or equal to about 70 weight % of the total mass of the total composite composition. In certain variations, the carbonated fly ash is present at greater than or equal to about 45 weight % to less than or equal to about 69% by weight of the cementitious binders present in the cementitious composite material. In certain variations, carbonated fly ash may be present in the cementitious composite material at greater than or equal to about 25 weight % to less than or equal to about 50% by weight of the wet cementitious composite material, and in certain variations, the carbonated fly ash is present at greater than or equal to about 30 weight % to less than or equal to about 45% by weight of the cementitious composite material on a wet basis, optionally, greater than or equal to about 33 weight % to less than or equal to about 43% by weight of the cementitious composite material on a wet basis.

Another suitable pozzolanic material is Portland cement that typically comprises inorganic compounds, such as dicalcium silicate ($C_2S$ or $2CaO.SiO_2$), tricalcium silicate ($C_3S$ or $3CaO.SiO_2$), tricalcium aluminate ($C_3A$ or $3CaO.Al_2O_3$), and tetracalcium aluminoferrite ($C_4AF$ or $4CaO.Al_2O_3.Fe_2O_3$), which may be hydrated. Commercially available Portland cement often includes additives, such as gypsum (calcium sulfate) that serves as a set retardant, and pozzolans, like fly ash and ground granulated blast furnace slags (GGBFS), that can react with calcium hydroxide and water to form calcium silicate hydrates or calcium aluminate hydrates. When other pozzolans are added to Portland cement, they are considered to be blended cements. ASTM, International Test C 150 called the "Standard Specification for Portland Cement" provides eight types of ordinary Portland cement for different applications, namely: Types I, IA, II, IIA, III, IIIA, IV, and V. In certain non-limiting aspects, the Portland cement used in the cementitious composition may be Type I.

The Portland cement may be present in the cementitious composite material at greater than or equal to about 25 mass or weight % to less than or equal to about 60 weight % of the total cementitious binders present in the cementitious composition, optionally at greater than or equal to about 30 weight % to less than or equal to about 50 weight % of the total cementitious binders present in the total composite composition. In certain variations, the Portland cement is present at greater than or equal to about 15 weight % to less than or equal to about 30% by weight in the cementitious composite material on a wet basis, optionally greater than or equal to about 17 weight % to less than or equal to about 28% by weight in the cementitious composite material, and in certain variations, the Portland cement is present at greater than or equal to about 19 mass % to less than or equal to about 28% by weight in the cementitious composite material on a wet basis.

Other binders may be present in the cementitious composite material that serve as a pozzolan/cementitious material, such as non-carbonated fly ash or calcium aluminate cement. In one variation, the fly ash may be a Class F fly ash or Class C fly ash as designated by ASTM C618-19, which may be formed from combustion of coals. ASTM C618 requires that Class F and Class C fly ashes contain at least 50% pozzolanic compounds (silica oxide, alumina oxide, and iron oxide). Class F fly ash may be formed from combustion of anthracite and/or bituminous coals, while Class C fly ash may typically be formed from combustion of lignite or subbituminous coal. Class F fly ash has less than about 18% maximum of calcium oxide (CaO), while Class C has greater than or equal to 18% calcium oxide (CaO). Class F fly ash has pozzolanic properties. Class C fly ash has pozzolanic properties, as well as some cementitious properties.

It should be noted that the binder systems provided in the engineered cementitious composite prepared according to certain aspects of the present disclosure are hydraulic and therefore do not require any $CO_2$ treatment to gain sufficient mechanical integrity. In other conventional technologies for carbon dioxide sequestration in concretes, the binder systems may lack hydraulicity and depend on carbonation to establish material strength, which poses strict limits on any thickness of an element formed, which must be adequately thin to allow $CO_2$ gas to diffuse through the entire cross-section in a short period of time. This also limits the application to reinforced concrete due to the low binder pH after the full-section $CO_2$ carbonation. In contrast, the binder systems in the present technology are essentially hydraulic and do not alter material pH. Therefore, they are not limited in applications.

Carbonated steel slag prepared in accordance with certain aspects of the present disclosure may be introduced into the cementitious composite material as a substitute for aggregate, like fine sand. In certain variations, the cementitious composite material has greater than or equal to about 15 mass % to less than or equal to about 25 mass % of carbonated steel slag in the total composition, optionally greater than or equal to about 21 mass % to less than or equal to about 23 mass % of carbonated steel slag in the total cementitious composite material on a wet basis. The carbonated steel slag is distributed within the cementitious matrix to form a cementitious composite material. In certain variations, the carbonated steel slag may be substantially homogeneously distributed within the cementitious composite material (e.g., concrete) that is formed.

The cementitious composition may also include an additional aggregate. Aggregates can be divided into different grades, for example, fine aggregate and course aggregate. Course aggregates include particles generally retained on a 4.75 mm sieve (No. 4 sieve), but that pass through 75 mm (3 inch) sieve. In certain variations, the cementitious composite material comprises a fine aggregate, such as an inert sand or inert finely crushed stone. Fine aggregates have a particle size distribution having approximately 95% passing on a 9.5 mm sieve (⅜ inch sieve). In certain variations, the fine aggregate is sand. The fine aggregate may comprise sand that has an average particle size of less than or equal to about 2 mm. In one non-limiting variation, the aggregate may be an F-75 silica or quartz sand commercially available from U.S. Silica. The aggregate, such as fine aggregate like sand, may be present in the cementitious composite material at greater than or equal to about 10 mass % to less than or equal to about 35 mass % of the total composition, optionally greater than or equal to about 10 mass % to less than or equal to about 25 mass % of the total composition.

In other aspects, the cementitious composition comprises at least one type of polymeric fiber distributed within the cementitious matrix to form a cementitious composite material (in combination with the aggregate solid material). In certain variations, the plurality of polymer fibers may be substantially homogeneously distributed within the cementitious composite material (e.g., concrete) that is formed. The polymer fibers may have a single composition or may include a mixture of different compositions or other combinations of select properties, such as different lengths or diameters. The polymer fibers may include a variety of distinct polymers; however, in certain variations, the fibers may comprise polyvinyl alcohol (PVA) or polyalkylene fibers, such as polyethylene (PE) or polypropylene (PP), including high tenacity polypropylene (HTPP) fibers. In other aspects, the polymer fibers may be natural polymer fibers, such as sisal, jute, curaua fibers, and/or cellulose-based fibers. In certain variations, the polymeric fibers may be oil coated. The oil coating may be greater than or equal to about 1 to less than or equal to about 1.5% by mass, for example, about 1.2% by mass, of the total mass/weight of the fiber and oil coating combined.

The polymer fiber may have an aspect ratio (AR) or ratio between a length of the fiber (L) and a diameter (D) of the fiber (AR=L/D) of greater than or equal to about 150. In certain variations, the AR may be greater than or equal to about 150 to less than or equal to about 900. For PVA fibers, an exemplary AR may be about 300, while for polypropylene fibers, an exemplary AR may be about 800.

In certain variations, a polymer fiber used in the cementitious composite material may have a length of greater than or equal to about 4 mm to less than or equal to about 20 mm, optionally greater than or equal to about 6 mm to less than or equal to about 15 mm, optionally greater than or equal to about 8 mm to less than or equal to about 12 mm, and in certain variations, optionally greater than or equal to about 8 mm to less than or equal to about 10 mm. In certain variations, a polymer fiber used in the cementitious composition has a diameter of greater than or equal to about 10 micrometers (μm) to less than or equal to about 200 μm. In one variation, the polymeric fiber is a PVA fiber that may have a length of about 12 mm and a diameter of about 40 micrometers. In another variation, the polymeric fiber is a PP fiber that may have a length of about 12 mm and a diameter of about 12 micrometers. The polymer fiber may be present in the cementitious composition at greater than or equal to about 1 vol. % to less than or equal to about 4.5 vol. % of the total volume of the cementitious composition, optionally at greater than or equal to about 1.8 vol. % to less than or equal to about 4 vol. %, and in certain variations, optionally at less than or equal to about 2 vol. %. In certain compositions, 2 vol. % is about 2.9 mass/weight %. In certain aspects, a PVA polymer fiber may be present in the cementitious composition at greater than or equal to 0 vol. % to less than or equal to about 2 vol. % of the total volume of the cementitious composition. Likewise, a PP polymer fiber may be present in the cementitious composition at greater than or equal to 0 vol. % to less than or equal to about 2 vol. % of the total volume of the cementitious composition.

Water is also included in the cementitious composition. As noted above, the amount of water added to the components may be adjusted to account for the amount of moisture present in the carbonated steel slag. A mass ratio of water to cementitious binder components (e.g., Portland cement, calcium aluminate cement, and pozzolanic materials, like fly ash) may be greater than or equal to about 0.2 to less than or equal to about 0.3. In one variation, a mass ratio of water to cementitious binder components is about 0.26. Water may be present in the cementitious composition at greater than or equal to about 10 mass % to less than or equal to about 20 mass % of the total composite composition, optionally at greater than or equal to about 14 mass % to less than or equal to about 17 mass % of the total composite composition. In one variation, the water may be present at about 15-16% by mass of the total composition.

In certain variations, the cementitious composite material further comprises one or more components selected from the group consisting of: microsilica, silica flour, a cellulose-based additive, a superplasticizer or high range water reducing agent (HRWR), and combinations thereof.

A superplasticizer or high range water reducing agent (HRWR) can be included at greater than or equal to about 0 mass % to less than or equal to about 0.3 mass % of the total cementitious composite material. One non-limiting example of a superplasticizer/HRWR is ADVA 195 HRWR sold by GCP Technologies, which is based on a polycarboxylate polymer (PCE).

Microsilica (MS) can be present in the cementitious composite material. Microsilica generally has an average particle size of greater than or equal to about 50 nm to less than or equal to about 200 μm. In one variation, an average particle size of the microsilica is greater than or equal to about 50 nm to less than or equal to about 200 nm, for example, a mean particle size may be about 150 nm (less than 0.1% of primary particles have a particle size of greater than 450 nm). A suitable microsilica is Elkem Microsilica® 955, which is commercially available from Elkem. The microsilica may be present at greater than or equal to about 0 mass % to less than or equal to about 5 mass % of the total cementitious composite material Ground silica, also called silica flour, may be added to the cementitious composition and generally has a particle size of greater than or equal to about 40 μm to less than or equal to about 300 μm. A suitable ground silica/silica flour is U.S. Silica brand Sil-Co-Sil™ 75 (crystalline quartz). The ground silica may be present in the cementitious composite material at greater than or equal to about 0 mass % to less than or equal to about 10 mass % of the total cementitious composite material; optionally at greater than or equal to about 0 mass % to less than or equal to about 5 mass % of the total cementitious composite material.

In various aspects, the total cumulative amount of aggregate in the cementitious composition, including the carbonated steel slag plus any fine aggregate like sand, microsilica, and ground silica may be greater than or equal to about 15 mass % to less than or equal to about 65 mass % of the total cementitious composite material.

In yet other aspects, the cementitious composition includes a cellulose-based additive, such as hydroxypropylmethyl cellulose (HPMC). The cellulose-based additive may be present at greater than or equal to about 0 mass % to less than or equal to about 0.6 mass % of the total cementitious composite material.

In certain variations, the cementitious composite material may comprise the carbonated fly ash and the carbonated steel slag prepared in accordance with certain aspects of the present disclosure, as well as Portland cement, high range water reducer (HRWR), PVA fiber, and PP fiber. The ingredients are combined with water. An exemplary cementitious composite material is shown in Table 3 below.

TABLE 3

| Component | Mass ratio (unless otherwise indicated) |
| --- | --- |
| Cement | 1 |
| Fly ash | 1.2-2.2 |
| Steel slag | 0.8-1.2 |
| Water | 0.58-0.8 |
| Superplasticizer/ High-range water reducer | 0.007-0.015 |
| PVA fiber | 0-2 vol. % |
| PP fiber | 0-2 vol. % |

Such a cementitious composite has ultrahigh tensile strain capacity, for example, it can achieve tensile ductility of greater than or equal to about 2%, and an ultimate tensile strength of greater than or equal to about 1 MPa, optionally greater than or equal to about 2 MPa, and in certain variations, optionally greater than or equal to about 3 MPa. The cementitious composite material forms autogenously tight crack widths through fiber bridging technologies, as well as having substantially enhanced material longevity through self-healing. The autogenous crack widths may be less than 100 μm, optionally less than or equal to about 75 μm, and optionally less than or equal to about 50 μm, without compromising tensile or compressive strength.

In one aspect, an engineered cementitious composite comprises carbonated fly ash and carbonated steel slag, where the carbonated fly ash and the Portland cement serve as cementitious binders. Thus, the engineered cementitious composite may comprise greater than or equal to about 40 weight % to less than or equal to about 75 weight % of the carbonated fly ash and greater 25 weight % to less than or equal to about 60 weight % Portland cement. In one aspect, the carbonated steel slag is the sole or only aggregate present in the engineered cementitious composite and thus serves as a substitute for conventional aggregates, like fine sand. In other words, the aggregate in the engineered concrete composition consists essentially of the carbonated steel slag.

In certain variations, an engineered cementitious composite is provided that comprises carbonated fly ash at a mass ratio of greater than or equal to about 1.2 to less than or equal to about 2.2, where the carbonated fly ash has greater than or equal to about 6% by weight of carbon dioxide uptake on a dry basis. In certain aspects, the carbonated fly ash may be partially replaced by microsilica, silica flour, and/or a cellulose-based additive. The engineered cementitious composition also comprises Portland cement at a mass ratio of about 1. The engineered cementitious composition also comprises carbonated steel slag at a mass ratio of greater than or equal to about 0.8 to less than or equal to about 1.2, wherein the carbonated fly ash has greater than or equal to about 8% by weight of carbon dioxide uptake on a dry basis. Water may be present at a mass ratio of greater than or equal to about 0.58 to less than or equal to about 0.8. A superplasticizer or high-range water reducer may be present at a mass ratio of greater than or equal to about 0.007 to less than or equal to about 0.015. Further, at least one polymeric fiber may be present. Such an engineered cementitious composite has a tensile strain capacity of greater than or equal to about 2% and a uniaxial tensile strength of greater than or equal to about 2 MPa.

In one aspect, the engineered cementitious composite has an autogenous crack width of less than or equal to about 100 μm.

In one aspect, the uniaxial tensile strength of greater than or equal to about 3 MPa.

In certain variations, the at least one polymeric fiber is present at greater than 0 to less than or equal to about 4 volume % of the at least one polymeric fiber. As noted above, these polymeric fibers may comprises PVA, PP, or combinations thereof.

In yet other variations, an engineered cementitious composite is provided that consists essentially of or alternatively consists of carbonated fly ash at a mass ratio of greater than or equal to about 1.2 to less than or equal to about 2.2, where the carbonated fly ash has greater than or equal to about 6% by weight of carbon dioxide uptake on a dry basis. Such an engineered concrete composition also includes Portland cement at a mass ratio of about 1. The engineered concrete composition optionally contains an additive selected from the group consisting of: microsilica, silica flour, a cellulose-based additive, and combinations thereof. The engineered concrete composition also comprises carbonated steel slag at a mass ratio of greater than or equal to about 0.8 to less than or equal to about 1.2, wherein the carbonated fly ash has greater than or equal to about 8% by weight of carbon dioxide uptake on a dry basis. Water may be present at a mass ratio of greater than or equal to about 0.58 to less than or equal to about 0.8. A superplasticizer or high-range water reducer may be present at a mass ratio of greater than or equal to about 0.007 to less than or equal to about 0.015. Further, at least one polymeric fiber may be present. Such an engineered cementitious composite has a tensile strain capacity of greater than or equal to about 2% and a uniaxial tensile strength of greater than or equal to about 2 MPa.

Thus, the present disclosure incorporates two types of industrial waste streams, including calcareous fly ash from coal combustion and steelmaking slag from steel refining industry subjected to a carbon sequestration process, followed by incorporation into an engineered composite concrete. In various aspects, the first steps of methods provided by the present disclosure transform these two waste-derived materials into value-added ingredients that can be used for producing engineered concrete by reacting with $CO_2$ gas (e.g., low-grade $CO_2$ gas). The present disclosure also contemplates methods of using such carbonated precursors in the engineered concrete along with a fiber-bridging technology that uses a micromechanical design framework to develop a highly ductile and strain-hardening cementitious composite materials, utilizing $CO_2$ and the two solid waste materials. This engineered cementitious composite material can replace traditional concrete for production of a variety of precast products, as well as for cast-in-place applications. This broadens $CO_2$ sequestration to the entire concrete market and does not set any restriction on product type or producing equipment.

Therefore, $CO_2$ sequestration capacity of concrete materials can be substantially increased by precarbonating precursor materials, but avoiding some of the attendant disadvantages suffered by other current cement/concrete $CO_2$ sequestration technologies. Developing tensile ductility and strain-hardening characteristics for the composite material fundamentally enhances material durability by controlling crack widths, which represents a challenge for durability development under traditional brittle concrete framework. In combination, the inventive technology enhances infrastructure sustainability by addressing both the material production phase (greening of the material by carbon sequestration) and the use phase (reducing carbon and energy footprints associated with repair needs through durability enhancements).

In certain variations, the present disclosure thus contemplates a method of preparing engineered cementitious composite precursors comprising carbonating a fly ash comprising greater than or equal to about 25% by weight of calcium oxide (CaO) and having a water content of greater than or equal to about 12% to less than or equal to about 18% by weight of water by exposing the fly ash to a first gas stream comprising carbon dioxide. The carbonating occurs until the fly ash has greater than or equal to about 4% by weight of carbon dioxide uptake on a dry basis to form a carbonated fly ash. The method also comprises carbonating a steel slag comprising greater than or equal to about 40% by weight of calcium oxide (CaO) and having a water content of greater than or equal to about 12% to less than or equal to about 18% by weight of water by exposing the steel slag to a second gas stream comprising carbon dioxide. The carbonating occurs until the steel slag has greater than or equal to about 5% by weight of carbon dioxide uptake on a dry basis to form a carbonated steel slag. The carbonated fly ash and the carbonated steel slag are suitable for use as engineered cementitious composite precursors in an engineered cementitious composite composition that further comprises Portland cement, a polymeric fiber, and a superplasticizer.

In certain aspects, the carbonating occurs until the fly ash has greater than or equal to about 6% by weight of carbon dioxide uptake in the carbonated fly ash and the carbonating occurs until the steel slag has greater than or equal to about 8% by weight of carbon dioxide uptake on a dry basis in the carbonated steel slag.

In certain aspects, prior to the carbonating the fly ash, the method further comprises introducing water into the fly ash to provide the water content of greater than or equal to about 12% to less than or equal to about 18% by weight of water or the other water content levels specified above.

In certain aspects, after the carbonating of the fly ash, the carbonated fly ash is dried so that it has a water content of less than or equal to about 0.5% by weight.

The method may further comprise milling the carbonated fly ash. After the milling, the carbonated fly ash may have an average particle size of less than or equal to about 30 μm.

In certain aspects, the method may further comprise prior to the carbonating the steel slag, separating particles of the steel slag by sieving it, so that steel slag subjected to the carbonating has an average particle size of less than or equal to about 220 μm.

The method may further comprise prior to carbonating the steel slag, measuring a water content of the steel slag and adjusting the water content to be greater than or equal to about 12% to less than or equal to about 18% by weight of water or any of the water content levels specified above.

In certain aspects, a suitable steel slag composition further comprises greater than or equal to about 10% to less than or equal to about 35% by weight silicon dioxide ($SiO_2$), less than or equal to about 15% by weight of aluminum oxide ($Al_2O_3$), less than or equal to about 15% by weight magnesium oxide (MgO), less than or equal to about 35% by weight iron oxide ($Fe_2O_3$), and less than or equal to about 5% by weight of sulfur oxide ($SO_3$).

In certain aspects, a suitable fly ash composition further comprises greater than or equal to about 20% to less than or equal to about 40% by weight silicon dioxide ($SiO_2$), less than or equal to about 20% by weight of aluminum oxide ($Al_2O_3$), less than or equal to about 10% by weight magnesium oxide (MgO), less than or equal to about 10% by weight iron oxide ($Fe_2O_3$), and less than or equal to about 5% by weight of sulfur oxide ($SO_3$).

In certain aspects, at least one of the first gas stream and the second gas stream are generated by an industrial source. As noted above, this may be a waste stream from a coal-fired facility, by way of non-limiting example.

The present disclosure also contemplates methods of preparing engineered cementitious composite. The method may comprise mixing a carbonated fly ash having greater than or equal to about 6% by weight of carbon dioxide uptake on a dry basis, a carbonated steel slag having greater than or equal to about 8% by weight of carbon dioxide uptake on a dry basis, Portland cement, at least one polymeric fiber, a superplasticizer, and water together to form an admixture that hydrates and forms the engineered cementitious composite having a tensile strain capacity of greater than or equal to about 2% and a uniaxial tensile strength of greater than or equal to about 1 MPa.

In one aspect, the engineered cementitious composite has an autogenous crack width of less than or equal to about 100 μm.

In one aspect, the uniaxial tensile strength of greater than or equal to about 3 MPa.

In one aspect, the carbonated steel slag is the sole or only aggregate present in the engineered cementitious composite and thus serves as a substitute for conventional aggregates, like fine sand. In other words, the aggregate in the engineered cementitious composition consists essentially of the carbonated steel slag.

In another aspect, the engineered cementitious composite comprises greater than 0 to less than or equal to about 2 volume % of the at least one polymeric fiber. As noted above, these polymeric fibers may comprises PVA, PP, or combinations thereof.

In one aspect, the engineered cementitious composite comprises the carbonated fly ash and the Portland cement as cementitious binders. Thus, the engineered cementitious composite may comprise greater than or equal to about 40 weight % to less than or equal to about 75 weight % of the carbonated fly ash and greater 25 weight % to less than or equal to about 60 weight % Portland cement.

In one aspect, the admixture comprises the Portland cement at a mass ratio of about 1, the carbonated fly ash at a mass ratio of greater than or equal to about 1.2 to less than or equal to about 2.2, the carbonated steel slag at a mass ratio of greater than or equal to about 0.8 to less than or equal to about 1.2, water at a mass ratio of greater than or equal to about 0.58 to less than or equal to about 0.8, and the superplasticizer at a mass ratio of greater than or equal to about 0.007 to less than or equal to about 0.015.

Example 1

Laboratory-scale experiments are described herein. Conditions of experimental trials are given to show the trajectory of process design and optimization. Table 4 has the engineered cementitious composition tested herein.

TABLE 4

Chemical compositions of engineered cementitious composition

| Component | Mass Ratio (or vol. %) |
|---|---|
| Cement | 1 |
| Carbonated Fly Ash | 2 |
| Water | 0.75 |
| Carbonated Steel Slag (as aggregate) | 1.2 |
| Superplasticizer | 0.014 |
| PVA fibers | 2 vol. % |

Step 1. $CO_2$ Sequestration in Pre-Carbonated Ingredients

First, $CO_2$ sequestration in calcareous fly ash is conducted. The as-received calcareous fly ash is a powdery material and contains CaO greater than about 20% by weight. The CaO-bearing phases in fly ash can be used for $CO_2$ sequestration by converting gaseous $CO_2$ into solid $CaCO_3$ minerals. Raw calcareous fly ash is subjected to a four-step process that includes (i) moistening, (ii) carbonation, (iii) dehumidifying, and (iv) milling. Each step is described below based on laboratory-scale experiments.

Step (i) moistening: This provides a sufficient aquatic environment for mineral carbonation. As-received fly ash can be moistened by mixing with 15 wt. % water to produce a uniformly dampened mixture. The wet mixture is spread into a thin layer (less than 10 mm) on a tray or plate to increase surface area for $CO_2$ exposure. The wet mixture needs to be immediately transferred to a chamber for carbonation to avoid any water loss.

Step (ii) carbonation: Carbonation is conducted in an enclosed vessel. High gas pressure and high $CO_2$ purity gas increases the rate of carbonation. Low-grade $CO_2$ source, such as coal combustion flue gas, however, can also be used if a longer carbonation duration is allowed. Heating or humidifying is not needed for carbonation. A continuous $CO_2$ supply is provided. For example, for 1 kg wet fly ash mixture, carbonation lasts for at least 30 min at 1.5 atm pressure.

Step (iii) dehumidifying: Residual water in the fly ash mixture is removed after carbonation. Maintaining a consistent water content in the carbonated fly ash helps attain consistent composite properties. Dehumidifying of the carbonated fly ash can be achieved by heating the environment in which the fly ash is disposed at temperature of 60-100° C., which could be sourced from waste heat. Approximately 30 minutes of heating at 60° C. adequately dehumidifies 1 kg of carbonated fly ash.

Step (iv) milling: The carbonation process alters fly ash to a form of ash-granule mix. The granules can be as large as 5-10 mm in diameter. To be used as an alternative cementitious material in place of virgin fly ash, the carbonated fly ash is milled down to an average particle size of below 30 µm. The milling step is conducted using a laboratory-scale ball mill using zirconia grinding media. At a low speed (30 rpm), the milling process can be completed in 6 hours, allowing over 90% of carbonated fly ash to pass a 30 µm sieve.

$CO_2$ Sequestration in Steelmaking Slag Sand.

Steelmaking slag is a granule mix including various particle sizes. Steelmaking slag here serves the purpose of sequestering $CO_2$ into sand (fine aggregate) for the ductile composite formulations. Raw steelmaking slag can be subjected to three steps: (i) sieving, (ii) humidity regulation, and (iii) carbonation. Details of each step are given below.

Step (i) sieving: Raw steelmaking slags are sieved to obtain sand particles. A fine Basic Oxygen Furnace (BOF) slag, in which more than 40 wt. % of raw particles are below 212 µm, is used as a starting material. This portion is used directly without grinding. Slag particles larger than 212 µm can also be used, either as pre-carbonated coarse aggregate in their as-received form or as pre-carbonated sand after an additional grinding and secondary sieving process.

Step (ii) humidity regulation: Because raw steelmaking slag is stored in various environments, the moisture content can be inconsistent across different sample batches. To optimize efficiency of carbonation, moisture content in slag samples is measured and adjusted as needed. Moisture content is adjusted to about 15% of dry slag mass by water addition. The slag and water is subsequently mixed in a regular concrete mixer.

Step (iii) carbonation: Once the steelmaking slag is at the optimal moisture condition, it can be immediately moved into an enclosed chamber for carbonation. Similar to fly ash carbonation, moistened slag is spread on a flat plate to maximize exposed surface area to $CO_2$ gas. Under the same condition as that for fly ash carbonation, it takes about 1 hour to complete the slag carbonation process. The carbonated slag can be directly used as sand in a concrete. Water content in the carbonated slag, however, is determined and used to adjust the actual mixing water quantity in composite formulations.

Step 2. Ductile Composite Integration

The carbonated fly ash and steelmaking slag are integrated with Portland cement to produce a new type of ductile and strain-hardening cementitious composite. The composite is designed with short random synthetic fibers at micrometer scale to develop an intrinsic crack bridging capability and ultrahigh tensile ductility. Besides technical properties of the microfibers, the matrix composition plays an important role in shaping the composite mechanical behavior. Under a micromechanical designing framework, the use of pre-carbonated ingredients can alter matrix strength, fracture toughness, and fiber/matrix interface, thereby affecting fiber failure type and composite ductility. Re-formulating compositions of pre-carbonated ingredients will help optimize composite properties. In this example, the tensile strain capacity of the cementitious composite is able to attain greater than or equal to about 2% by tailoring proportions of pre-carbonated fly ash and steelmaking slag with respect to cement mass. At optimal conditions, about 6.5 wt. % and 7.0 wt. % $CO_2$ gas can be sequestered by fly ash and steelmaking slag, respectively.

One example of an engineered cementitious composite comprising carbonated precursors prepared in accordance with certain aspects of the present disclosure is shown in FIG. 1. More specifically, tensile stress (MPa) versus tensile strain (%) is shown for this engineered concrete composition at 3 days and 7 days of hydration/curing. As can be seen, the engineered cementitious composite achieves greater than 2 MPa of ultimate tensile strength, while further achieving a tensile strain of greater than 3%.

FIG. 2 shows a net carbon dioxide footprint for an example of an engineered cementitious composite comprising carbonated precursors prepared in accordance with certain aspects of the present disclosure. By way of comparison, where traditional concrete has a Portland cement content of 15% and is blended with 30% fly ash, it has an approximate carbon dioxide footprint of about 92-95 kg $CO_2$ emitted/tonne of concrete. In contrast, the engineered cementitious composite example shown in FIG. 2 has a $CO_2$ footprint of approximately 62-63 kg $CO_2$ emitted/tonne concrete, or a reduction in the carbon dioxide footprint of greater than or equal to about 30%. As shown in FIG. 2, the $CO_2$ emissions of engineered cementitious composite prepared in accordance with certain aspects of the present disclosure is shown. A limestone calcined clay cement (LC3) is used in place of Portland cement and combined with the carbonated fly ash and steel slag. FIG. 2 shows a low carbon strategy that couples low carbon binder (e.g., LC3) and the carbon-sequestered ingredients (e.g., carbonated fly ash and carbonated steel slag). The carbonated precursors prepared in accordance with certain aspects of the present disclosure provide a $CO_2$ utilization of −27.2 $CO_2$ emitted/tonne for the carbonated fly ash and −15.4 $CO_2$ emitted/tonne for carbonated steel slag. The LC3 cement incorporating the carbonated precursors (carbonated fly ash and carbonated steel slag) emits 104.5 kg $CO_2$/tonne of cement produced.

The present disclosure provides a new carbon dioxide ($CO_2$) sequestration technology that integrates ductile cementitious formulations with tailorable $CO_2$ capture processes. The methods permanently sequester $CO_2$ into waste-derived ingredients for producing concrete. Such methods are particularly suitable for forming concrete structures or for use in coal powered facilities, where waste coal ashes and waste $CO_2$ from coal combustion can be transformed to a ductile and durable concrete building product in accordance with certain aspects of the present disclosure. This technology can be applied to construction of general concrete infrastructure systems. The applications of the inventive composite materials include, but are not limited to, steel reinforced and cast-in-place constructions as well as concrete structures exposed to extreme environments, as it demonstrates superior durability due to the crack width control and self-healing capabilities. The life cycle $CO_2$ emissions can be reduced by enhancing infrastructure durability through concrete crack width control. The high material ductility potentially eliminates the needs for steel reinforcement, hence further extending structural service life by eliminating corrosion-induced deteriorations. The low-carbon ingredients, high $CO_2$ storage capability and enhanced material durability collectively serve to create a more efficient, durable and sustainable concrete infrastructure system.

It should be noted that the engineered cementitious compositions prepared in accordance with the present methods incorporating carbonated precursors not only have diminished carbon footprints, but further have hydraulic binders that provide a concrete that achieves comparable compressive strength to conventional concrete compositions, while exhibiting tensile strengths of greater than 1 MPa to less than or equal to about 4 MPa, a tensile ductility of greater than or equal to about 2%, have autogenously controlled crack widths of less than or equal to about 100 μm, among other advantages. In various aspect, the inventive technology provides $CO_2$ sequestration of pre-carbonated ingredients for low carbon material production that forms engineered cementitious composite compositions having fiber-bridging technology for mitigating life-cycle carbon emissions. This engineered cementitious composite leads to a type of more sustainable and potentially carbon-negative cementitious material through service life.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of preparing engineered cementitious composite precursors comprising:
   carbonating a fly ash comprising greater than or equal to about 25% by weight of calcium oxide (CaO) and having a water content of greater than or equal to about 12% to less than or equal to about 18% by weight of water by exposing the fly ash to a first gas stream comprising carbon dioxide, so that the fly ash has greater than or equal to about 4% by weight of carbon dioxide uptake on a dry basis to form a carbonated fly ash; and
   carbonating a steel slag comprising greater than or equal to about 40% by weight of calcium oxide (CaO) and having a water content of greater than or equal to about 12% to less than or equal to about 18% by weight of water by exposing the steel slag to a second gas stream comprising carbon dioxide, so that the steel slag has greater than or equal to about 5% by weight of carbon dioxide uptake on a dry basis to form a carbonated steel slag; wherein the carbonated fly ash and the carbonated steel slag are suitable for use as engineered cementitious composite precursors in an engineered cementitious composite composition that further comprises Portland cement, a polymeric fiber, and a superplasticizer.

2. The method of claim 1, wherein the carbonating the fly ash occurs until the fly ash has greater than or equal to about 6% by weight of carbon dioxide uptake in the carbonated fly ash and the carbonating the steel slag occurs until the steel slag has greater than or equal to about 8% by weight of carbon dioxide uptake on a dry basis in the carbonated steel slag.

3. The method of claim 1, further comprising prior to the carbonating the fly ash, introducing water into the fly ash to provide the water content of greater than or equal to about 12% to less than or equal to about 18% by weight of water.

4. The method of claim 3, wherein after the carbonating the fly ash, the carbonated fly ash is dried so that it has a water content of less than or equal to about 0.5% by weight.

5. The method of claim 4, further comprising milling the carbonated fly ash.

6. The method of claim 5, wherein after the milling, the carbonated fly ash has an average particle size of less than or equal to about 30 μm.

7. The method of claim 1, further comprising prior to the carbonating the steel slag, sieving the steel slag so that steel slag subjected to the carbonating has an average particle size of less than or equal to about 220 μm.

8. The method of claim 1, further comprising prior to the carbonating steel slag, measuring a water content of the steel slag and adjusting the water content to be greater than or equal to about 12% to less than or equal to about 18% by weight of water.

9. The method of claim 1, wherein the steel slag further comprises greater than or equal to about 10% to less than or equal to about 35% by weight silicon dioxide ($SiO_2$), less than or equal to about 15% by weight of aluminum oxide ($Al_2O_3$), less than or equal to about 15% by weight magnesium oxide (MgO), less than or equal to about 35% by weight iron oxide ($Fe_2O_3$), and less than or equal to about 5% by weight of sulfur oxide ($SO_3$).

10. The method of claim 1, wherein the fly ash further comprises greater than or equal to about 20% to less than or equal to about 40% by weight silicon dioxide ($SiO_2$), less than or equal to about 20% by weight of aluminum oxide ($Al_2O_3$), less than or equal to about 10% by weight magnesium oxide (MgO), less than or equal to about 10% by weight iron oxide ($Fe_2O_3$), and less than or equal to about 5% by weight of sulfur oxide ($SO_3$).

11. The method of claim 1, wherein at least one of the first gas stream and the second gas stream are generated by an industrial source.

12. A method of preparing engineered cementitious composite comprising:
   mixing a carbonated fly ash having greater than or equal to about 6% by weight of carbon dioxide uptake on a dry basis, a carbonated steel slag having greater than or equal to about 8% by weight of carbon dioxide uptake on a dry basis, Portland cement, at least one polymeric fiber, a superplasticizer, and water together to form an admixture that hydrates and forms the engineered cementitious composite having a tensile strain capacity of greater than or equal to about 2% and a uniaxial tensile strength of greater than or equal to about 1 MPa.

13. The method of claim 12, wherein the engineered cementitious composite has an autogenous crack width of less than or equal to about 100 μm.

14. The method of claim 12, wherein the uniaxial tensile strength is greater than or equal to about 3 MPa.

15. The method of claim 12, wherein the engineered cementitious composite contains only the carbonated steel slag as an aggregate.

16. The method of claim 12, wherein the engineered cementitious composite comprises greater than 0 to less than or equal to about 4 volume % of the at least one polymeric fiber.

17. The method of claim 12, wherein the engineered cementitious composite comprises the carbonated fly ash and the Portland cement as cementitious binders, wherein the engineered cementitious composite comprises greater than or equal to about 40 weight % to less than or equal to about 75 weight % of the carbonated fly ash and greater 25 weight % to less than or equal to about 60 weight % Portland cement.

18. The method of claim 12, wherein the admixture comprises the Portland cement at a mass ratio of about 1, the carbonated fly ash at a mass ratio of greater than or equal to about 1.2 to less than or equal to about 2.2, the carbonated steel slag at a mass ratio of greater than or equal to about 0.8 to less than or equal to about 1.2, water at a mass ratio of greater than or equal to about 0.58 to less than or equal to about 0.8, and the superplasticizer at a mass ratio of greater than or equal to about 0.007 to less than or equal to about 0.015.

* * * * *